Jan. 25, 1949.   H. L. SMITH, JR   2,460,197
VACUUM CHAMBER EVACUATION
Filed Nov. 14, 1945
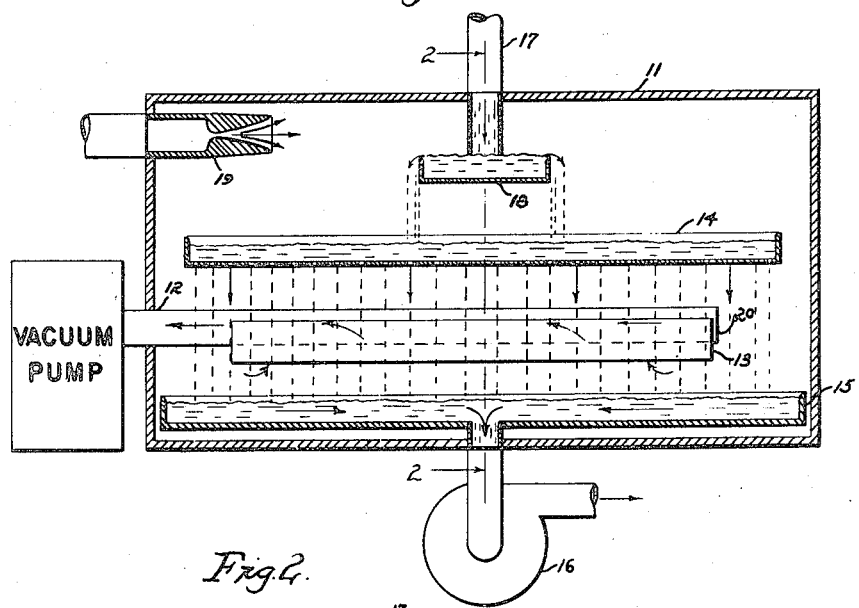
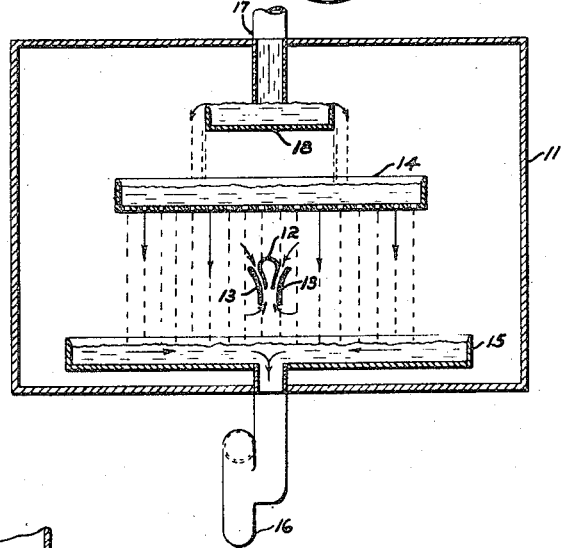
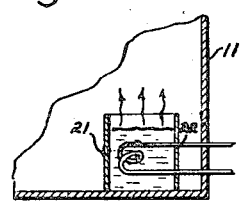
HORACE L. SMITH, JR.
*INVENTOR.*
BY George A. Evans
*ATTORNEY*

Patented Jan. 25, 1949

2,460,197

UNITED STATES PATENT OFFICE 2,460,197

VACUUM CHAMBER EVACUATION

Horace L. Smith, Jr., Richmond, Va., assignor to Chain Belt Company, Milwaukee, Wis., a corporation of Wisconsin Application November 14, 1945, Serial No. 628,428

11 Claims. (Cl. 230—73)

This invention relates to the removal of gas such as air from a chamber in which it is desired to maintain low pressure conditions.

The invention is especially valuable in operations where at times it is necessary to break the vacuum and restore the chamber to atmospheric or other higher pressures prior to recreating the original vacuum, for it provides means whereby the time required to create the desired degree of vacuum with given vacuum producing equipment may be very materially reduced.

An example of such operation is in the freeze-drying of products such as food, blood plasma and the like wherein the water content of the product is maintained in frozen condition throughout the drying period because of the high degree of vacuum maintained in the drying chamber. In such operations the ice sublimes directly to water vapor and the latter is eliminated by suitable condensing or absorbing means. If the drying process is performed on separate batches of the product, it is usually necessary to break the vacuum at the conclusion of each batch operation, and even if continuous methods are employed, it is essential periodically to discontinue operations and open the chamber to clean surfaces that contact the product. Because of the very high degree of vacuum which is maintained during the drying period, the time required to re-establish the vacuum after an interruption of the character mentioned, is considerable and may substantially reduce the total output of the drier.

The invention may perhaps be best described in connection with the use of constant volume displacement pumps, but it will be clear as the description proceeds that it is applicable to other vacuum producing means such as multi-stage steam jet pumps. It is a characteristic of all such evacuating means that while they remove gas at a fairly high rate when the pressure is high, as evacuation proceeds, the rate measured in the mass of gas removed becomes progressively slower because of the expansion of the gas and the decrease in weight of gas removed by the pump for each successive interval of time.

Because it is important in most applications to produce a vacuum in a short period of time, pumping equipment of very large capacity is normally employed. Often in the same applications, greatly reduced pumping capacity will suffice to maintain the vacuum once it is created. If the pumping capacity which is requisite to maintain the vacuum could be made to create the vacuum in a relatively short period of time, considerable savings would result in the cost of the original equipment.

It is an object of the present invention to provide a method of evacuating a chamber containing noncondensable gases whereby vacuum producing equipment of a given capacity may be employed to remove the desired amount of such gas from the chamber in a shorter period of time than heretofore possible.

A further object of the invention is to provide means whereby a vacuum of high order once created in the chamber may be maintained against incidental leakages into the chamber during prolonged periods of time by vacuum producing equipment of very low capacity.

These and other objects of the invention are accomplished by the provision of novel means and method for maintaining a relatively high total pressure of condensable and noncondensable gases within the chamber while removing by evacuating means only the noncondensable gases, whereby the mass of the noncondensable gas will be removed at a higher rate than if no condensable gas were present in the chamber, and the condensable gas is removed by condensing means to maintain the total pressure in the chamber approximately constant. Specifically the invention provides for introduction of a condensable gas into the chamber and by the condensing of the latter by condensing means so arranged that all of the noncondensable gas passing to the evacuating means has to pass through the condensing means to condense the added gas. The condensable gas is most advantageously introduced so as to create turbulence in the chamber and sweep in its path to the condensing means a maximum amount of the noncondensable gas in the chamber. Operating under these conditions for a relatively short period of time, substantially all the noncondensable gas is removed and only condensable gas remains in the chamber. When this condition is obtained, the supply of condensable gas is discontinued, and the condensable gas remaining in the chamber is quickly condensed to produce practically instantaneously the desired high vacuum.

Where the initial vacuum has already been created and water vapor is evolved in the chamber as during the drying of products therein, the same condensing and evacuating arrangement may be employed, but without the introduction of any additional condensable gas, to maintain the requisite high degree of vacuum in a most economical manner.

Reference may be had to the accompanying drawings for a diagrammatic illustration of the operation of the invention, in which:

Figure 1 is a side view partly in section of the vacuum chamber;

Figure 2 is a section taken on line 2—2 of Figure 1; and

Figure 3 is a section of a corner of the chamber illustrating a modified form of the means for creating the additional condensable gas in the chamber.

According to the drawings the vacuum chamber 11, which may be of any desired shape or size, is provided with a port through which there extends a conduit 12 communicating with the vacuum pump. The conduit 12 is generally an inverted U-shape as shown in Figure 2, and arranged on either side of it, as an inverted parenthesis, are downward converging baffle members 13.

Arranged above the conduit 12 is a perforated pan 14 and below it is a receiving pan 15 which communicates with a pump 16. A suitable condensing medium, such as a low temperature brine of lithium chloride, is introduced into the chamber through the pipe 17 and flows over the edges of annular trough 18 arranged directly beneath the pipe 17. The overflow liquid is received in the pan 14 and from thence it falls in a finely divided form as a rain or spray from the openings in the bottom of the latter. This spray covers an area which completely encloses the opening on the underside of the conduit and drops into the receiving pan 15 from whence it is pumped out of the chamber.

The chamber is also provided with one or more steam inlet nozzles 19 through which steam may be introduced into the chamber at very high velocity. Preferably the nozzle has a metering orifice which determines its rate of flow, the walls of the orifice being divergent, as illustrated in Figure 1, in order that the gas which is introduced through it may expand adiabatically to gain velocity as it enters the chamber and thus create maximum turbulence and mixing of the added condensable gas with the noncondensable gas in the chamber.

When the vacuum pump first starts operating, the removal of relatively dense air or gas is at a fairly high rate, but as the pressure drops the rate of removal of each pound of air is progressively reduced. By introducing a condensable gas, such as steam into the chamber, the total pressure in the chamber is the sum of the partial pressures of the two gases, and if an adequate supply of condensing medium is constantly furnished to condense the water vapor at the same rate as it is introduced into the chamber, a relatively constant higher pressure may be maintained until substantially all the air has been removed by the pump.

The time required to remove the air after the steam is introduced is considerably less than if the pressure had not been maintained at a higher value and after the air content has been substantially removed, it requires but a very short time to condense the steam in the chamber with the steam supply discontinued.

A brine solution of lithium chloride is especially suited for condensing the water vapor introduced into the chamber because of its vapor pressure characteristics in the range of pressures involved, its freezing point, its viscosity, and also because of its affinity for water vapor. The brine is refrigerated prior to its introduction into the chamber so that at the pressure prevailing in the chamber the brine will not lose any vapor of its own. Suitable means may be employed to regenerate and refrigerate the brine leaving the pump 16 so as to permit its reintroduction into the chamber through the pipe 17. Reference may be had to my copending application, Serial No. 608,106 filed August 1, 1945, for details of such a system.

The conduit 12 leading to the vacuum pump is arranged so that all of the air or noncondensable gases have to pass first through the condenser before reaching the vacuum pump and in this connection it is desirable to close the end 20 of the conduit and to limit the length of the opening of the underside of the conduit to somewhat less than the length of the spray pan 14. The baffles 13 catch the spray as it falls and deflect it toward the orifice of the suction conduit, thereby causing the entrained air to be brought to the region most immediately influenced by the suction action of the pump.

Certain practical considerations will affect the application of the invention and the range of pressures which it will be desirable to maintain through the generation of condensable gas in the chamber. In many instances, the pump alone may be relied upon during the initial stages of evacuation and only in the last stage of the evacuation will steam be added. Of course, the rate of steam introduction will depend upon the capacity of the condenser, the size of the chamber and the aforementioned factor of the pressure it is desired to maintain during this stage of the process.

Since the density of the gas at the inlet end of the conduit leading to the vacuum pump is maintained relatively high, the rate of removal of gas, measured by units of weight per unit of time, is high. The operation is continued until substantially all the air in the chamber has been swept through the condenser by movement of the water vapor. If the admission of steam is discontinued, the residual water vapor is immediately condensed, thereby reducing the absolute pressure to a very low value and in a short period of time.

The process described above is particularly valuable in a drying operation where vacuum conditions of a high order are maintained and the water vapor given off from the product is eliminated by the same condensing means as are used in creating the initial vacuum. Such a drying operation is described in detail in my aforementioned application, Serial No. 608,106. Once the vacuum has been obtained, the pump is relied upon merely to remove such air as may leak into the chamber, the entire quantity of water vapor given off by the product being condensed by the brine and eliminated by the brine pump 16. This also makes for efficient operation and relatively low pumping capacity.

While it is desirable to introduce steam into the chamber, as shown in Figure 1, to create turbulence and intimate mixing of the steam with the air in the chamber, other means for producing condensable gas in the chamber may be employed. For instance, a boiler 21 having steam heating coils 22 may be located within the chamber, as shown in Figure 3, and water in the boiler transformed to water vapor for the purposes explained. Whatever method of steam generation, it is important that the steam be free of air, or an added load will be placed on the vacuum producing equipment, and the benefits of the present invention may be largely nullified.

The invention having been described, what is claimed is:

1. A method for removing condensable and noncondensable gases from a chamber, which comprises providing in the chamber a spray of a condensing liquid, withdrawing the noncondensable gas from the chamber through the spray while the condensable gas is condensed and collected in the spray and thereafter condensing the condensable gas in the chamber.

2. Method for rapidly creating a vacuum within a given space which comprises evacuating air therefrom by means of evacuating means while assisting the travel of said air to said evacuating means by a current of a condensable gas, said gas being condensed and eliminated from said space independently of said evacuating means and thereafter condensing the condensable gas within the space.

3. Method of creating a high vacuum within a given space which comprises evacuating the noncondensable gas therefrom by suitable evacuating means while assisting the travel of such noncondensable gas toward said evacuating means by introducing into said space during the operation a totally absorbable second gas and absorbing said second gas in a liquid incapable of yielding a gas to said space at the pressure prevailing therein, the noncondensable gas being swept toward the evacuating means and removed from the space after having been exposed to the condensing action of said liquid.

4. Method of creating a high vacuum within a given space which comprises evacuating the air therefrom by suitable evacuating means while assisting the travel of said air toward said evacuating means by introducing into said space during the operation a totally absorbable gas and absorbing said gas in a liquid incapable of yielding a gas to said space, the air being swept toward the evacuating means by the absorbable gas and having the absorbable gas removed therefrom before passage of the air to the evacuating means.

5. Method of rapidly producing a vacuum within a confined space which comprises evacuating the air from said space while partially substituting a condensable vapor therefor, and totally condensing said vapor within said space by medium incapable of yielding vapor to said space.

6. Method of creating a vacuum within a confined space which comprises, during the evacuation of the air therefrom, the sweeping of air from the space by a rapid current of steam, which vapor is condensed and absorbed within said space by a brine of lithium chloride.

7. A method of creating a high vacuum in a chamber in a relatively short period of time with a pump of limited capacity which comprises providing in the chamber a spray of an absorbent liquid having a vapor pressure lower than the vapor pressure of water at the corresponding temperature and pressure, simultaneously introducing water vapor into the chamber and removing by the pump through the spray substantially all the noncondensable gases in the chamber while the water vapor is condensed and collected in the spray, and thereafter discontinuing the introduction of water vapor in the chamber.

8. A method of evacuating a chamber which comprises removing some of the gas from the chamber by evacuating means; then introducing a condensable gas into the chamber to reduce the rate of decrease of the pressure therein caused by the evacuating means; concurrently with the introduction of condensable gas condensing the same by direct liquid contact with a condensing medium; continuing to remove gas from the chamber during said last mentioned step, the gas being so removed being drawn through the condensing medium; and thereafter when the desired amount of gas has been withdrawn by the evacuating means, discontinuing the introduction of condensable gas in the chamber.

9. Apparatus of the class described comprising a chamber, a vacuum pump, means for producing a spray of condensing liquid in the chamber, a conduit connected to the pump extending into the chamber in the path of the spray, said conduit having an opening on its underside, and downward converging baffles on either side of the conduit for entraining gas with the spray to accelerate the influence of the vacuum pump on noncondensable gases and means for eliminating from the chamber the condensable liquid and the condensable gases which it may contain.

10. A method of creating a vacuum within a confined space which comprises introducing within the space a condensable gas, condensing the aforesaid condensable gas by direct liquid contact with a condensing agent, withdrawing from the space the noncondensable gases which have been exposed to contact with the condensing agent, and after the desired quantum of noncondensable gases have been evacuated, discontinuing the introduction of condensable gas.

11. A method of evacuating air from a chamber which comprises maintaining within the chamber during the evacuation period a pressure higher than the pressure of the air by combining with the air a condensable gas, condensing the condensable gas from the air which is evacuated from the chamber, and after the desired quantum of air is evacuated condensing the remaining condensable gas in the chamber.

HORACE L. SMITH, Jr.

REFERENCES CITED

The following references are of record in the file of this patent:

UNITED STATES PATENTS

| Number | Name | Date |
|---|---|---|
| 940,648 | Tomlinson | Nov. 16, 1909 |